United States Patent [19]
Gambotti

[11] 3,951,450
[45] Apr. 20, 1976

[54] INFANT SEAT FOR AUTOMOTIVE AND OTHER VEHICLES

[75] Inventor: Paul Gambotti, Caluire, France

[73] Assignee: Societe Anonyme dite RECPRO, Aux Maholiere, Pont de Veyle-Ain, France

[22] Filed: Nov. 18, 1974

[21] Appl. No.: 524,892

[30] Foreign Application Priority Data
Nov. 20, 1973 France............................. 73.41912

[52] U.S. Cl................................... 297/238; 297/16
[51] Int. Cl.²......................................... A47C 15/00
[58] Field of Search .......... 297/232, 238, 117, 191, 297/146, 16; 296/30, 31, 65 R; 5/95, 96

[56] References Cited
UNITED STATES PATENTS

| | | | |
|---|---|---|---|
| 1,379,499 | 5/1921 | Williford.......................... | 297/238 X |
| 2,605,817 | 8/1952 | Craig-Wallace..................... | 297/380 |
| 2,966,201 | 12/1960 | Strahler............................. | 297/238 |
| 3,515,431 | 6/1970 | Grady................................ | 297/250 |

FOREIGN PATENTS OR APPLICATIONS 280,663   11/1927   United Kingdom................ 297/238

*Primary Examiner*—James T. McCall
*Attorney, Agent, or Firm*—Karl F. Ross; Herbert Dubno

[57] ABSTRACT

An infant seat for an automotive or other vehicle in which a vehicle seat is provided with a rearwardly open recess in its back and the infant seat is folded and articulated therein so that it may be received fully in the recess or can extend therefrom to accommodate a child.

5 Claims, 4 Drawing Figures

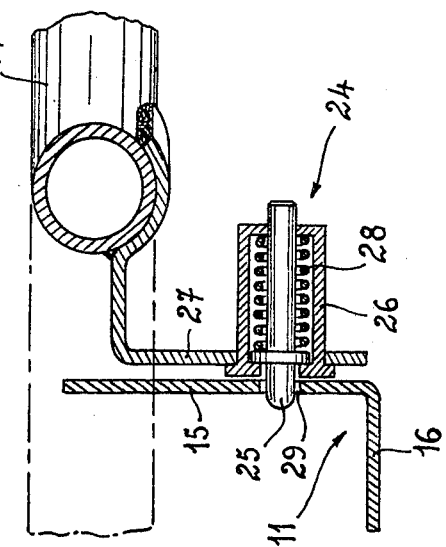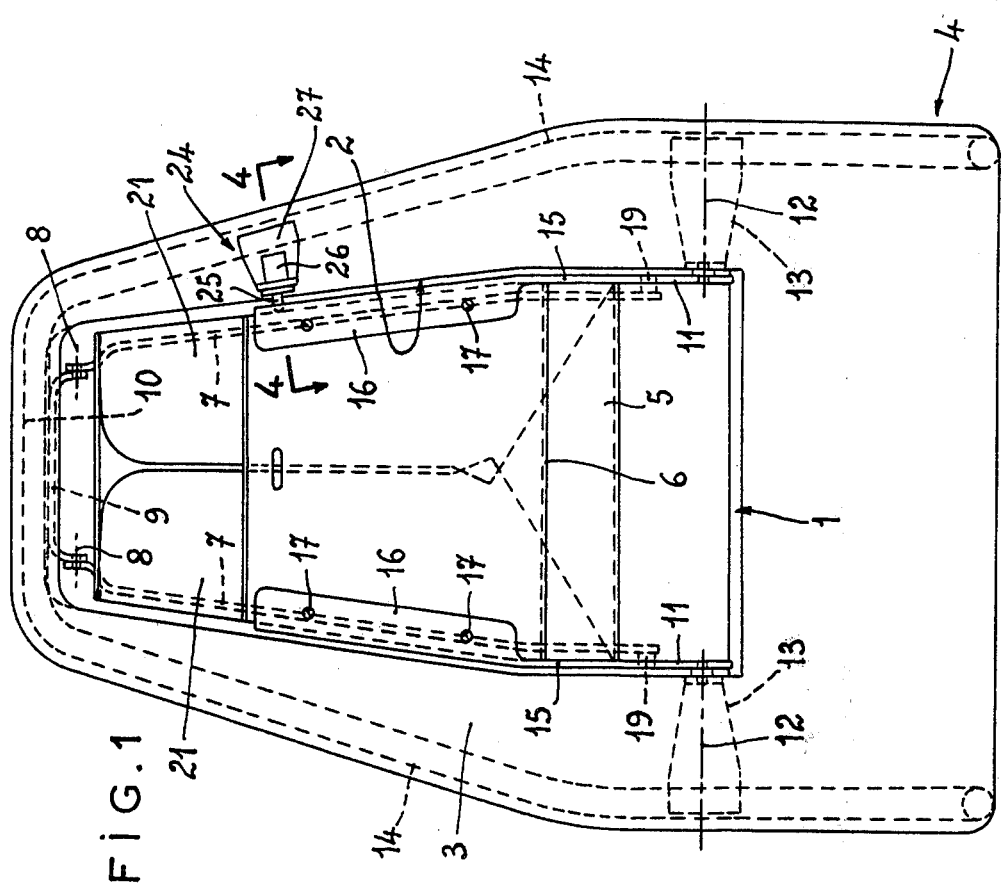

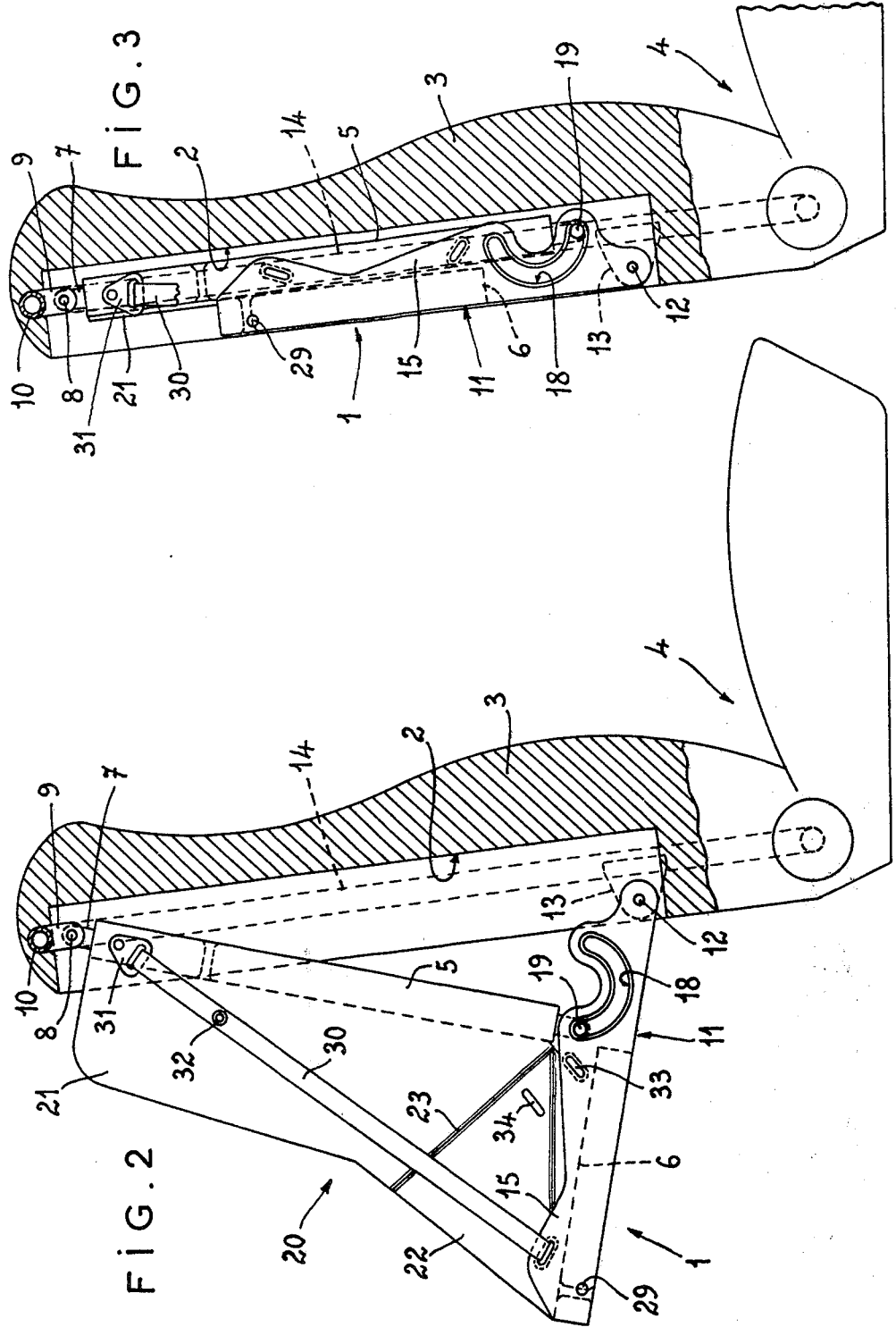

INFANT SEAT FOR AUTOMOTIVE AND OTHER VEHICLES

FIELD OF THE INVENTION

The present invention relates to a seat for carrying children in cars and other vehicles.

BACKGROUND OF THE INVENTION

Seats are currently in existence, which are specifically intended for carrying children in cars. These seats are removable and hang on the back of a seat or rest up on the bench of the vehicle seat. The child in such a seat thus faces in the direction of normal travel of the vehicle.

Although provided with safety-belts, existing seats for children may be dangerous, since frequently they are not provided with a mechanism for securing them to the back in a sufficiently effective manner. In addition, when they are not in use, they occupy considerable space in the vehicle.

OBJECT OF THE INVENTION

It is the object of the present invention to provide a seat for carrying children, which no longer has the drawbacks of current seats.

SUMMARY OF THE INVENTION

The seat of the invention is fitted in a housing provided in the back of a seat of the vehicle and it can be folded so that it may either be extended outwards for use, or retracted inside the aforesaid housing.

A seat of this type has various advantages. In the first place, it is not removable, but, on the contrary, rigidly anchored and thus always perfectly secure. When it is not in use for carrying a child, this seat is folded and thus does not provide an obstacle for passengers entering the vehicle.

According to a particularly advantageous embodiment, the seat housing is provided in the rear of the back of the seat of the vehicle, being disposed rearwards such that the child faces the direction contrary to the normal travel of the vehicle.

In the case of a sudden stoppage of the vehicle, the child's back as well as his head are supported against the seat, which is important for the child's safety. In addition, in the case of an accident, the seat in which the child is sitting is in turn protected by the back in which it is fitted.

In the case where the seat extends rearwards, it is composed essentially of a back and a squab respectively pivoted to the upper and lower part of the housing, the lower end of the pivoted back comprising parts engaged in apertures provided on the sides of the squab. In this manner, the seat is extended by lowering the squab and pivoting the back slightly to give it a suitable inclination. The back and squab are linked in their movements by the engagement of certain parts of the back in apertures in the squab and when these parts abut against one end of the apertures, the squab is automatically retained in its position of use.

Advantageously, the apertures provided on the sides of the squab have a substantially semi-circular shape, their ends being directed upwards when the seat is in the position of use.

According to another feature of the invention, locking means are provided on the edge of the housing, which are capable of immobilizing the squab and/or the back of the seat in the folded position. Since the back and squab are connected, it is sufficient to lock one in order to immobilize the other. This locking is necessary in order that the seat does not open rearwardly on its own, under the action of its weight or in the case of an impact.

Furthermore, the seat according to the invention may comprise, on each side, a lateral panel pivoted on the one hand to the squab and on the other hand to the back and in turn divided into two parts by a joint enabling it to be folded back between the squab and the back when the seat is folded. These lateral panels improve the stability of the child on the seat without increasing the bulk of the latter when it is in the folded position.

Finally, according to another possible embodiment, the housing for the seat is provided in the front of the back of the seat of the vehicle, it being extended forwards such that the child faces the direction of normal travel of the vehicle. For example, the seat is fitted in the back part of the rear seat of a car and, when it is folded, the bench-seat is as comfortable as a normal seat, since the visible parts of the folded infant's seat are padded.

BRIEF DESCRIPTION OF THE DRAWING

The invention will be better understood from the ensuing description, referring to the accompanying diagrammatic drawing, in which:

FIG. 1 is a front view of a seat according to the invention fitted in the rear of a car seat and shown in the folded position;

FIG. 2 is a side view of the seat of FIG. 1, in the extended position;

FIG. 3 is a partial view, similar to FIG. 2, the seat being shown in the folded position; and FIG. 4 is a detailed view, to an enlarged scale, showing the locking means in section on line 4—4 of FIG. 1.

SPECIFIC DESCRIPTION

The child's seat according to the invention, designated generally at 1, is fitted in a housing 2 of substantially rectangular shape provided in the back 3 of a seat 4. The seat 4 is the front seat of a car for example, either that of the passenger or that of the driver, but naturally it may also be a bench-seat occupying the entire width of the vehicle.

The seat 1 is composed of several members which are pivoted in order to be able to be extended rearwards, as shown in FIG. 2, or folded and retracted inside the housing 2, as shown in FIGS. 1 and 3. In this case, the direction of extension is such that the child faces the direction contrary to the normal travel of the vehicle.

The main parts of the seat 1 are a back 5 and a squab 6, made in the traditional manner as a metal frame covered with foam or a similar material, in turn covered with fabric, to provide the necessary comfort and have a pleasant appearance.

The side members 7 of the frame for the back 5 extend upwards, beyond the back 5 and their upper ends are pivoted about a common horizontal axis 8, to a stirrup member 9 welded to the upper crossbar 10 of the frame supporting the back 3 of the seat 4.

The side members 11 of the frame for the squab 6 extend beyond the squab and their ends are pivoted, about a common horizontal axis 12, to brackets 13 forming journals, welded to the uprights 14 of the frame supporting the back 3 of the seat 4.

The side members 11 of the frame for the squab 6 each have a part 15 located in a vertical plane and a right-angled portion 16 making it possible to secure the squab 6 by means of screws 17. In its part adjacent the pivot axis 12, each member 11 comprises an aperture 18 of substantially semi-circular shape, whereof the ends are directed upwards when the seat is in its position of use, as shown in FIG. 2.

The lower end of the back 5 comprises projecting parts 19, which may be constituted by simple screws, which are engaged in the apertures 18.

Provided on the sides of the seat 1 are lateral panels 20, made from light and relatively flexible materials such as cardboard lined with foam and covered with polyvinyl chloride. Each panel 20 is in turn divided into two parts 21 and 22, separated by a joint 23 produced by a welding line.

Fixed to one edge of the housing 2 are locking means designated by the general reference 24 and shown in more detail in FIG. 4. These means are composed of a pin 25 slidably mounted in a cage 26, supported by a bracket 27, which is in turn welded to an upright 14 of the frame for the seat 4. The pin 25 is pushed by a spring 28 and when the seat is folded, it may penetrate a complementary opening 29 provided in one of the lateral members 11 of the squab 6.

The aforedescribed seat 1 may also be completed by a plate fulfilling the function of a leg rest, not shown in the drawing.

Finally, in manner known per se, the seat 1 comprises a belt and/or straps for retaining the child and ensuring his safety. Thus, the seat illustrated is equipped with a strap 30 attached to a stirrup member 31 and provided with a push-button 32 making it possible to tighten it and it also comprises apertures 33, 34 for the passage of a ventral belt, not shown in the drawing.

The seat 1 is rigidly anchored to the back 3, since all its parts are connected to the frame of said back. The various anchorage means used are concealed by a box made from injected or heat-formed plastics material, or from shaped light-weight metal sheet forming the base and sides of the housing 2.

The operation of the seat 1 according to the invention will be easily deduced from the preceding description. In the position for use, shown in FIG. 2, the squab 6 is lowered, the back 5 is moved away from the base of the housing 2 and the lateral panels 20 are extended. These various parts automatically assume their correct positions, since the projecting parts 19 engaged in the apertures 18 abut against the end of said apertures most remote from the pivot axis 12.

If the seat is not in use, it is possible to place it in the folded position shown in FIGS. 1, 3 and 4. The back 5 is thus placed against the bottom of the housing 2, the squab 6 is raised and placed parallel to the back 5. The lateral panels 20 are folded about their joint 23, such that their two parts 21 and 22 come into contact one with the other and fit in the space existing between the back 5 and squab 6. The projecting parts 19 of the back 5 abut against the end of the apertures 18 of the squab 6 nearest the pivot axis 12 and the arrangement is retained by the locking means 24, whereof the pin 25 engages in the opening 29.

Naturally, the invention is not limited to the single embodiment of this child's seat above-described as a non-limiting example. On the contrary, it includes all variations. Thus, in particular, the seat according to the invention may also be fitted in a housing provided not in the rear, but in the front part of the back of a seat. This is applicable to the rear seats of cars or certain motor coach seats or even seats in other vehicles. In this case, it is clear that the child faces in the direction of normal travel of the vehicle. Nevertheless, the invention is applicable to all types of vehicle provided with seats and/or bench-seats and in a given vehicle, it is possible to provide either a single seat according to the invention or several seats in the case where the vehicle is able to carry more than one child. It is also possible to provide combinations of seats, two opposing seats anchored one to a front seat and the other to a rear bench-seat possible serving as a bunk for the child.

I claim:

1. In a vehicle having a passenger seat provided with a back, the improvement wherein:
    said back is provided with a rearwardly open recess;
    an articulated infant seat is mounted on said back and is foldable for receipt in said recess and unfoldable to project therefrom and accommodate an infant, said infant seat comprises a back member pivotably connected at an upper part thereof to said back of said passenger seat and a seat member pivotably connected to said back or said passenger seat at a lower portion of said recess, said seat member being formed with apertures along opposite sides thereof and said back member having portions slidably received in said apertures.

2. The improvement defined in claim 1 wherein the passenger seat and said infant seat are so arranged and constructed that an infant in said infant seat faces in a direction opposite the normal direction of travel of said vehicle.

3. The improvement defined in claim 1 wherein said apertures are of substantially semicircular shape and are bowed downwardly when said seat member is swung out of said recess in a position of use.

4. The improvement defined in claim 1, further comprising retaining means on said back of said passenger seat and engageable with one of said members for retaining said members within said recess.

5. The improvement defined in claim 1 wherein each of said members is provided with a pair of lateral panels on opposite sides, the panels of each side being interconnected by respective folding joints on either side of said members.

* * * * *